(12) United States Patent     (10) Patent No.:     US 6,338,204 B1
Howle                         (45) Date of Patent:     Jan. 15, 2002

(54) TAPE MEASURE WITH INTEGRATED LEVEL

(76) Inventor: Jennifer Howle, 7525 Holly Hill #66, Dallas, TX (US) 75231

(*) Notice: Subject to any disclaimer, the term of this patent is extended or adjusted under 35 U.S.C. 154(b) by 0 days.

(21) Appl. No.: 09/435,346

(22) Filed: Sep. 20, 1999

(51) Int. Cl.[7] ............................................. G01B 3/10
(52) U.S. Cl. ........................................ 33/758; 33/755
(58) Field of Search ....................... 33/758, 333, 334, 33/347, 354, 370, 374, 375, 451, 483, 492, 493, 494, 755, 759, 760, 761, 768, 769, 770, 27.02, 27.03, 27.031, 27.032, 668

(56) References Cited

U.S. PATENT DOCUMENTS

| | | | | |
|---|---|---|---|---|
| 1,145,244 A | * | 7/1915 | Hoffman | 33/755 |
| 2,230,010 A | * | 1/1941 | Owens | 33/489 |
| 2,816,369 A | * | 12/1957 | Becker | 33/760 |
| 3,021,599 A | * | 2/1962 | Odom | 33/761 |
| 3,036,791 A | * | 5/1962 | Siggelkow | 33/758 |
| 3,568,322 A | * | 3/1971 | Showers | 33/768 |
| 4,506,451 A | | 3/1985 | Hiltz | |
| 4,700,489 A | | 10/1987 | Vasile | |
| 4,759,441 A | | 7/1988 | Leurck | |
| 4,827,622 A | | 5/1989 | Makar | |
| 5,035,060 A | | 7/1991 | Scott | |
| 5,075,977 A | | 12/1991 | Rando | |
| 5,077,910 A | | 1/1992 | Smith | |
| 5,182,863 A | | 2/1993 | Rando | |
| 5,287,627 A | | 2/1994 | Rando | |
| 5,430,952 A | * | 7/1995 | Betts | 33/760 |
| 5,459,647 A | | 10/1995 | Betts | |
| 5,735,052 A | | 4/1998 | Lin | |
| 5,829,152 A | | 11/1998 | Potter et al. | |

FOREIGN PATENT DOCUMENTS

| | | | | |
|---|---|---|---|---|
| FR | 2706031 | * | 12/1994 | 33/758 |
| JP | 404307301 | * | 10/1992 | 33/755 |

* cited by examiner

Primary Examiner—Christopher W. Fulton
(74) Attorney, Agent, or Firm—David W. Carstens; Carstens, Yee & Cahoon, L.L.P.

(57) ABSTRACT

A tape measure comprising a housing having a rubber base and flexible tape coiled up inside, and a top section having a level. The flexible tape is marked with linear measurement scales on the top and bottom. A horizontal slit runs lengthwise along the flexible measuring tape. An inverted pull tab having a "C" shape attaches to the end of the flexible tape. Two vertical slits extend outward from the horizontal slit near the end of the flexible tape. The top section connects to the housing at a center joint, allowing the top section to lock into set angular positions. Alternative embodiments have a fixed top section with multiple levels and/or a rubber base comprising a rubber roller mechanism. The tape measure is used by affixing a nail to a vertical surface, fitting the vertical slit over the nail, extending the flexible tape to the desired distance, rotating the tape measure about the nail until the desired angle is balanced in the level, and then marking the desired spot inside the horizontal slit.

10 Claims, 2 Drawing Sheets

TAPE MEASURE WITH INTEGRATED LEVEL

BACKGROUND OF THE INVENTION

The present invention generally relates to a universal tape measure comprising a rigid housing containing flexible measuring tape. The universal tape measure is used for measuring point to point distances by pulling the flexible tape out of the rigid housing, and positioning the flexible tape between two points.

The prior art reveals many multifunctional tape measures. For example, Rando discloses an Automatic Plumb and Level Tool with Acoustic Measuring Capability (see U.S. Pat. No. 5,287,627), wherein a laser is used rather than flexible measuring tape. In U.S. Pat. No. 5,735,052, Chung discloses a flexible tape measure capable of drafting a circle and measuring the horizontal distance between two points on different vertical levels. Chung's tape measure comprises a rigid housing having a pen tip opening for inserting a writing instrument, and a circle center hole located near the end of the flexible tape. The rigid housing rotates about the center hole, and the writing instrument therein the rigid housing drafts a circle. In U.S. Pat. No. 4,827,622, Makar discloses an attachment for a flexible tape measure. Makar's attachment movably fits along the flexible tape, allowing multiple uses of the tape measure such as a level and a square.

In view of the prior art, no tape measure or similar device exists wherein the device may be used by a single user to mount multiple items on a vertical surface at a precise angle and distance from each other. A need for such a device exists in every home, where people must hang pictures or other items.

SUMMARY OF THE INVENTION

The foregoing problems are solved and a technical advance is achieved by the provision of a tape measure with an integrated level.

Accordingly, the tape measure of the present invention comprises a housing having a rubber base and flexible measuring tape coiled up inside, and a top section having a level. The rubber base provides a semi-adhesive backing such that the tape measure will not easily move when placed up against a vertical surface. The flexible measuring, tape is marked with linear measurement scales on the top and bottom, allowing identical reading from either direction. A horizontal slit runs lengthwise along the flexible measuring tape, centered between the top and bottom measurement scales. An inverted pull tab attaches to the end of the flexible measuring tape, whereat the inverted pull tab forms a "C" shape bending inwards over the top of the flexible measuring tape. Two vertical slits extend outward from the horizontal slit, one above and one below the horizontal slit, near the end of the flexible measuring tape. The vertical slits are rounded to allow the insertion of a small nail. The top section movably connects to the housing, whereat the top section pivots about a center joint between the housing and top section. The top section locks into set angular positions as it pivots about the center joint. An alternative embodiment of the present invention has a fixed top section with multiple levels. Another alternative embodiment of the present invention has a rubber base comprising a rubber roller mechanism.

The present invention is used by hanging a first item, and then using the tape measure to hang a second item at a distance and angle with reference to the first item. The vertical slit is placed over the nail used to hang the first item, the flexible measuring tape is pulled out of the housing to the desired distance, the tape measure is rotated about the nail (and vertical slit) until the desired angle is balanced in the level, and then the desired spot is marked inside the horizontal slit.

BRIEF DESCRIPTION OF THE DRAWINGS

For a more complete understanding of the present invention, and for further details and advantages thereof, reference is now made to the following detailed Description taken in conjunction with the accompanying drawings, in which.

DETAILED DESCRIPTION OF THE PREFERRED EMBODIMENTS

Figure 1:
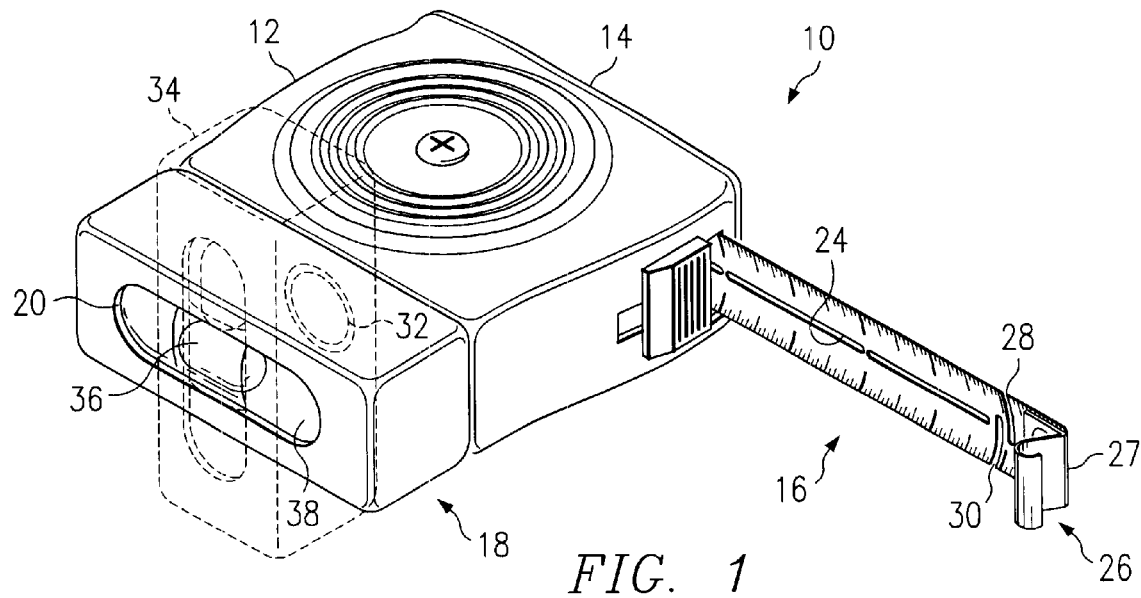
FIG. 1 is a three-dimensional view of an embodiment of the present invention.
Figure 1A:
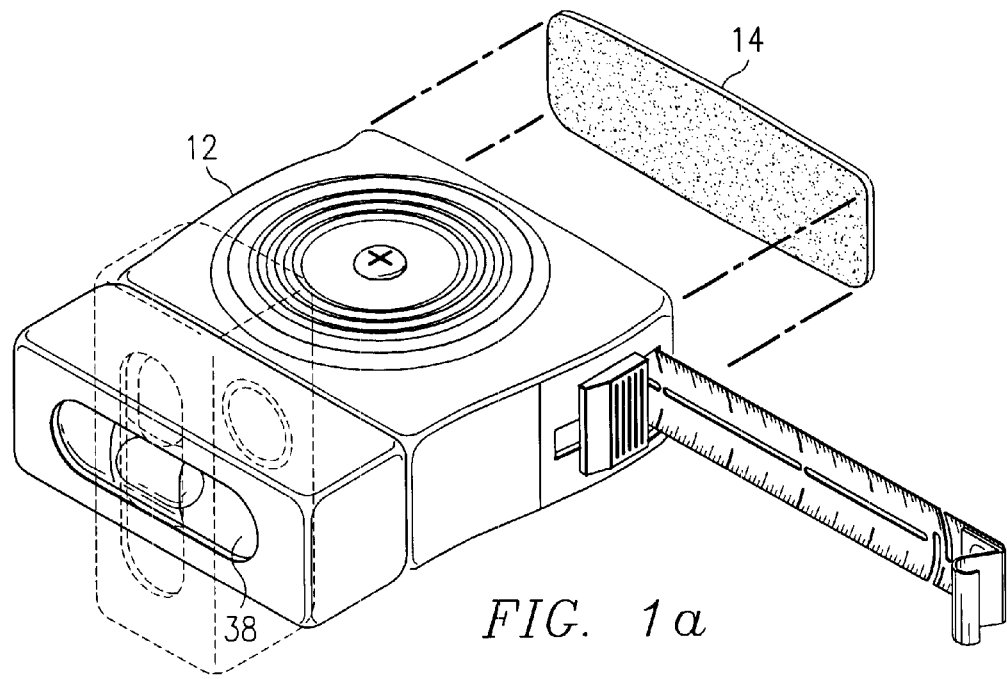
FIG. 1a is a perspective view illustrating the base detail of an embodiment of the present invention.

FIGS. 1 and 1a illustrate an embodiment of the present invention, wherein a tape measure 10 comprises a housing 12 having a rubber base 14 and flexible measuring tape 16 that coils up inside the housing 12, and a top section 18 having a level 20. The rubber base 14 attaches to the bottom of the housing 12 with any suitable adhesive, or with two or more screws. The rubber base 14 provides a semi-adhesive backing such that the tape measure 10 will not easily move when placed up against a vertical surface, allowing the user to hold the tape measure 10 with one hand while adjusting the flexible measuring tape 16 or making a mark on the wall with the other hand.

Figure 2:
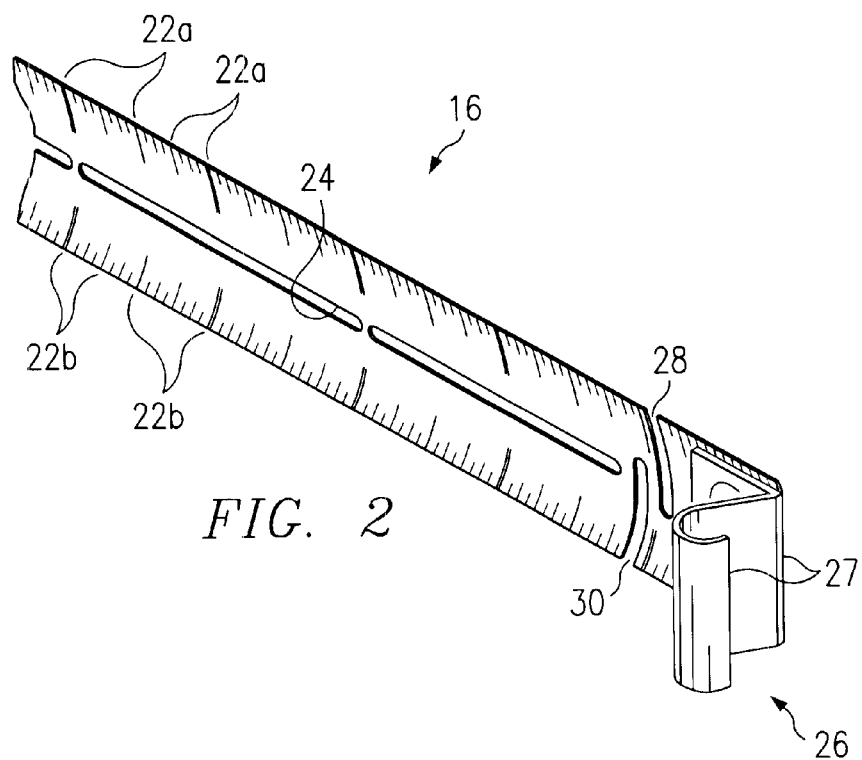
FIG. 2 illustrates a detailed view of the markings and slots on the tape portion.

Referring to FIGS. 1 and 2, the flexible measuring tape 16 is marked with linear measurement scales 22a and 22b on the upper and lower longitudinal side edges of the top of the flexible measuring tape 16, allowing identical reading on either longitudinal side edge. The linear measurement scales 22a and 22b may be any suitable measurement system such as Metric or the English Standard, provided the same scale is marked on both the upper and lower longitudinal side edges of the top of the flexible measuring tape 16. Multiple linear scales 22a and 22b may be used. A horizontal slit 24 runs lengthwise along the flexible measuring tape 16, centered between the [top and bottom] measurement scales 22a and 22b on the upper and lower longitudinal side edges of the top of the flexible measuring tape 16. The horizontal slit 24 may be continuous or broken in increments along the flexible measuring tape 16. For example, if the measuring tape 10 has a relatively short flexible measuring tape 16 (i.e., five feet), then a single horizontal slit 24 may be practical. However, if the flexible measuring tape 16 is relatively long (i.e., thirty feet), then use of incremental horizontal slits 24 would be more practical in ensuring the strength and stability of the flexible measuring tape 16. An inverted pull tab 26 attaches to the end of the flexible measuring tape 16, whereat the inverted pull tab 26 forms a "C" shape bending inwards over the top of the flexible measuring tape 16. The outer edges 27 of the inverted pull tab 26 can be collectively perpendicular to the flexible measuring tape 16. Therefore, the inverted pull tab 26 can rest flush against a flat surface when the flexible measuring tape 16 is extended outward against a wall. The "C" shape of the inverted pull tab 26 also provides a finger sized gripping device. Two vertical slits 28 and 30 extend outward from the horizontal slit 24, one above and one below the horizontal slit 24, near the end of the flexible measuring tape 16. The vertical slits 28 and 30 are rounded to allow the insertion of a small nail. The vertical slits 28 and 30 may be located at the same horizontal location, or they may be horizontally spaced. Additional vertical slits 28 and 30 may be included at other horizontal locations along the flexible measuring tape 16. The vertical slits 28 and 30 may intersect with the horizontal slit 24, or the vertical slits 28 and 30 may be located away from the horizontal slit 24, as illustrated.

The top section 18 movably connects to the housing 12 so that the top section 18 pivots about a center joint 32 between the housing 12 and top section 18. The top section 18 could lock into set angular positions such as 0, 30, 45, 60, and 90 degrees as it pivots about the center joint 32. For example, the top section 18 locks into a 90 degree position 34 as illustrated by the phantom lines in FIG. 1. The level 20 is positioned horizontally in the top section 18. The level 20 is a standard level device comprising a clear, liquid filled tube having a bubble 36 moving along the length of the tube. The level 20 reaches a balance when the bubble 36 centers about a center mark 38 on the clear tube.

Figure 3:
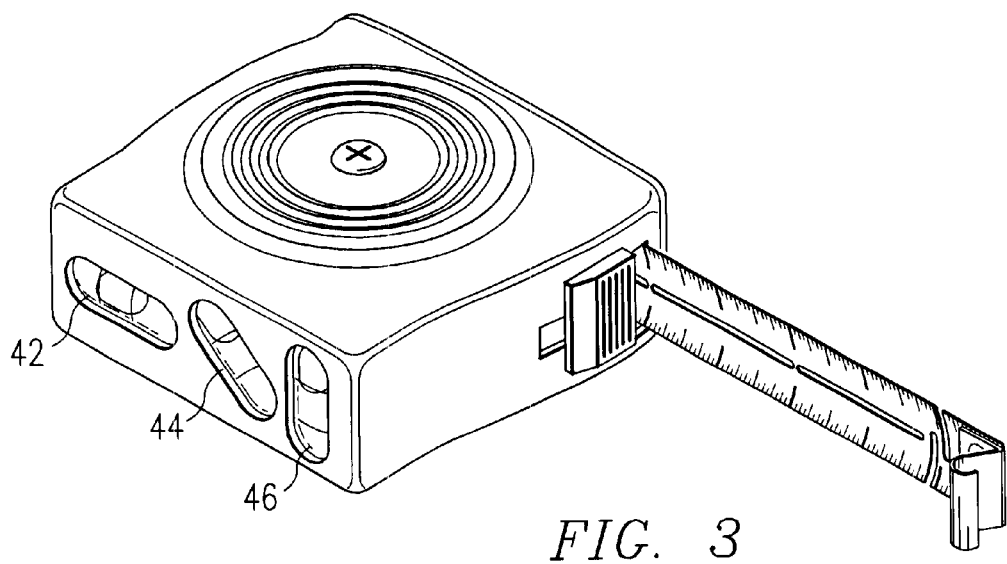
FIG. 3 is a three-dimensional view of an alternate embodiment of the present invention, having a fixed top section.

FIG. 3 illustrates an alternative embodiment of the present invention, wherein the tape measure 10 has a fixed top section 40 with multiple levels 42, 44 and 46. In this alternate embodiment, the preferred levels would be a horizontal level 42, a 45 degree level 44, and a 90 degree level 46.

The present invention is used by hanging a first item, and then using the tape measure 10 to hang a second item at a distance and angle with reference to the first item. The vertical slit 28 or 30 is placed over the mounting nail used to hang the first item, the flexible measuring tape 16 is pulled out of the housing 12 to the desired distance, the tape measure 10 is rotated about the nail (and vertical slit 28 or 30) until the desired angle is balanced in the level 20, and then the desired spot is marked inside the horizontal slit 24.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A tape measure comprising:
   (a) a housing having a rubber base fixably attached to its bottom;
   (b) a tape with measurement markings retractable into the housing, wherein said tape has at least one horizontal slit running lengthwise along said tape's longitudinal axis and at least two vertical slits traversing the longitudinal axis of the tape, wherein each vertical slit extends outward from a centerline parallel to said tape's longitudinal axis to a longitudinal side edge of the tape, and wherein at least two vertical slits are paired in close proximity and extend in opposite directions from one another; and
   (c) a level connected to the top of the housing, wherein said tape's longitudinal axis may be oriented at various selective orientations relative to the level's horizontal axis.

2. The tape measure of claim 1 wherein said level is rotatably attached to said housing.

3. The tape measure of claim 1 wherein the level is rotatable into specific angular positions.

4. The tape measure of claim 1 wherein the level comprises a fluid filled clear tube, a center mark on the tube, and a bubble movable inside the tube, the bubble indicating a level position when the bubble centers about the center mark.

5. The tape measure of claim 1 wherein each slit has rounded ends.

6. The tape measure of claim 1 wherein the paired slits traversing the longitudinal axis of the tape are positioned near an end of the tape.

7. A tape measure comprising:
   (a) a housing having a rubber base fixably attached to its bottom;
   (b) a flexible tape with measurement markings, retractable into the housing, wherein said tape has at least one horizontal slit running lengthwise along said tape's longitudinal axis and at least two vertical slits traversing the longitudinal axis of the tape, wherein each vertical slit extends outward from a centerline parallel to said tape's longitudinal axis to a longitudinal side edge of the tape, and wherein at least two vertical slits are paired in close proximity and extend in opposite directions from one another; and
   (c) a top section fixably attached to the top of the housing comprising a plurality of level devices each defining a horizontal axis, wherein said tape's longitudinal axis may be oriented at various selective orientations relative the horizontal axis of each of the plurality of level devices.

8. A method of operating a tape measure to mount multiple items on a substantially vertical surface at a specific distance and angle relative to a first item using a tape measure comprising a housing, a top section with at least one level, and a flexible tape with measurement markings retractable into the housing wherein said tape has at least one slit running lengthwise along said tape's longitudinal axis and at least one slit traversing the longitudinal axis of the tape, the method comprising the steps of:
   (a) affixing a first item to a first spot on a substantially vertical surface;
   (b) hooking one slit traversing the longitudinal axis of the tape onto the first item;
   (c) extending the flexible tape outwardly from the first item, to a desired distance;
   (d) rotating the tape measure and flexible tape collectively about the first item until the level is balanced at a desired angle relative to the first spot;
   (e) marking a desired second spot;
   (f) affixing a second item at the desired second spot.

9. The method of claim 8 wherein the top section is movably connected to the housing at a pivot joint, whereat the top section rotates into specific angular positions, the method further comprising a first step, before step (a), wherein the top section is rotated and fixed to the desired angular position.

10. The method of claim 8 wherein the flexible tape has at least one slit running lengthwise along said tape's longitudinal axis, and at least one slit traversing the longitudinal axis of the tape and steps (b) and (e) further comprising the following:

(b) fitting the slit traversing the longitudinal axis of the tape over a first affixed item, thereby fixing the flexible tape at the first item, making the first item a pivot point for the tape measure;

(e) marking the desired spot through the slit running lengthwise along the tape's longitudinal axis.

\* \* \* \* \*